(12) United States Patent
Zhou

(10) Patent No.: US 11,199,743 B2
(45) Date of Patent: Dec. 14, 2021

(54) BACKLIGHT MODULE AND DISPLAY DEVICE

(71) Applicant: Wuhan China Star Optoelectronics Semiconductor Display Technology Co., Ltd., Wuhan (CN)

(72) Inventor: Gege Zhou, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 447 days.

(21) Appl. No.: 16/323,511

(22) PCT Filed: Nov. 20, 2018

(86) PCT No.: PCT/CN2018/116320
§ 371 (c)(1),
(2) Date: Feb. 5, 2019

(87) PCT Pub. No.: WO2020/062500
PCT Pub. Date: Apr. 2, 2020

(65) Prior Publication Data
US 2021/0325730 A1 Oct. 21, 2021

(30) Foreign Application Priority Data
Sep. 27, 2018 (CN) .......................... 201811129796.5

(51) Int. Cl.
*G02F 1/13357* (2006.01)
*F21V 8/00* (2006.01)
*G02F 1/1335* (2006.01)

(52) U.S. Cl.
CPC ..... *G02F 1/133605* (2013.01); *G02B 6/0055* (2013.01); *G02F 1/133512* (2013.01); *G02F 1/133608* (2013.01)

(58) Field of Classification Search
None
See application file for complete search history.

(56) References Cited

U.S. PATENT DOCUMENTS 9,897,742 B2 * 2/2018 Jin ....................... G02B 6/0055

* cited by examiner

*Primary Examiner* — Vip Patel

(57) ABSTRACT

A backlight module and a display device are provided. The backlight module includes a light guide plate, a frame, a light source assembly, a reflective sheet, an optical film, and a light shielding sheet. The frame is disposed around the light guide plate. The light source assembly is disposed on a side surface of the light guide plate and fixed on the light guide plate and the frame. The reflective sheet is disposed on a bottom surface of the light guide plate. The optical film is disposed on a top surface of the light guide plate. The light shielding sheet is disposed on a surface of the optical film away from the light source assembly.

20 Claims, 1 Drawing Sheet

BACKLIGHT MODULE AND DISPLAY DEVICE

FIELD OF INVENTION

The present disclosure relates to the field of display technologies, and more particularly to a backlight module and a display device.

BACKGROUND OF INVENTION

At present, liquid crystal display devices have been widely used in various electronic products as display components of electronic devices, and consumers have higher and higher requirements to a use environment of the electronic devices. Backlight modules are important components in the liquid crystal display devices, and optical performance requirements thereof are getting higher and higher. A current backlight module is easy to leak light on opposite sides of a light source. Light is emitted from a light guide plate body, is reflected to the frame, and is refracted to a visible area through an optical film, that is, light leakage occurs.

Therefore, there is a need to provide a backlight module and a display device to solve issues existing in the prior art.

SUMMARY OF INVENTION

In order to solve the above technical problems, the present disclosure provides a backlight module. The backlight module includes a light guide plate, a frame, a light source assembly, a reflective sheet, an optical film, and a light shielding sheet. The light guide plate includes a top surface, a bottom surface, and a side surface interconnecting the top surface to the bottom surface. The frame is disposed around the light guide plate. The light source assembly is disposed on the side surface of the light guide plate and fixed on the light guide plate and the frame. The reflective sheet is disposed on the bottom surface of the light guide plate. The optical film is disposed on the top surface of the light guide plate. The light shielding sheet is disposed on a surface of the optical film away from the light source assembly. The light shielding sheet protrudes from an edge of the optical film. The light shielding sheet protrudes from an edge of the light guide plate. A thickness of the light shielding sheet is less than or equal to 0.01 mm. The light shielding sheet is formed by a flexible member.

In an embodiment of the present disclosure, the optical film includes an upper surface and a lower surface opposite to the upper surface, the lower surface of the optical film is in contact with the top surface of the light guide plate, and the light shielding sheet is disposed on the lower surface of the optical film, on the top surface of the light guide plate, and between the optical film and the light guide plate.

In an embodiment of the present disclosure, the light shielding sheet is disposed on the upper surface of the optical film.

In an embodiment of the present disclosure, the backlight module further includes a light shielding adhesive and an electrically conductive double-sided tape, the light shielding adhesive is disposed on the optical film and the frame, such that the optical film is fixed on the frame by the light shielding adhesive, and the electrically conductive double-sided tape is disposed between the reflective sheet and the frame, such that the reflective sheet is fixed on the frame by the electrically conductive double-sided tape.

In an embodiment of the present disclosure, the light source assembly includes a light source flexible circuit board and a light source disposed on the light source flexible circuit board, and the backlight module further includes a double-sided tape disposed among the light source flexible circuit board, the frame, and the light guide plate, such that the light source flexible circuit board is fixed on the frame and the light guide plate by the double-sided tape.

The present disclosure further provides a backlight module. The backlight module includes a light guide plate, a frame, a light source assembly, a reflective sheet, an optical film, and a light shielding sheet. The light guide plate includes a top surface, a bottom surface, and a side surface interconnecting the top surface to the bottom surface. The frame is disposed around the light guide plate. The light source assembly is disposed on the side surface of the light guide plate and fixed on the light guide plate and the frame. The reflective sheet is disposed on the bottom surface of the light guide plate. The optical film is disposed on the top surface of the light guide plate. The light shielding sheet is disposed on a surface of the optical film away from the light source assembly.

In an embodiment of the present disclosure, the optical film includes an upper surface and a lower surface opposite to the upper surface, the lower surface of the optical film is in contact with the top surface of the light guide plate, and the light shielding sheet is disposed on the lower surface of the optical film, on the top surface of the light guide plate, and between the optical film and the light guide plate.

In an embodiment of the present disclosure, the light shielding sheet is disposed on the upper surface of the optical film.

In an embodiment of the present disclosure, the light shielding sheet protrudes from an edge of the optical film.

In an embodiment of the present disclosure, the light shielding sheet protrudes from an edge of the light guide plate.

In an embodiment of the present disclosure, a thickness of the light shielding sheet is less than or equal to 0.01 mm.

In an embodiment of the present disclosure, the light shielding sheet is formed by a flexible member.

In an embodiment of the present disclosure, the backlight module further includes a light shielding adhesive and an electrically conductive double-sided tape, the light shielding adhesive is disposed on the optical film and the frame, such that the optical film is fixed on the frame by the light shielding adhesive, and the electrically conductive double-sided tape is disposed between the reflective sheet and the frame, such that the reflective sheet is fixed on the frame by the electrically conductive double-sided tape.

In an embodiment of the present disclosure, the light source assembly includes a light source flexible circuit board and a light source disposed on the light source flexible circuit board, and the backlight module further includes a double-sided tape disposed among the light source flexible circuit board, the frame, and the light guide plate, such that the light source flexible circuit board is fixed on the frame and the light guide plate by the double-sided tape.

The present disclosure further provides a display device including a display panel and the backlight module described above. The backlight module is disposed under the display panel.

Compared with the prior art, in order to solve the above technical problems, in the embodiments of the present disclosure, the backlight module and the display device include a light shielding film disposed on the surface of the optical film away from the light source assembly, which can improve light leakage of the backlight module through the light shielding sheet and improve an optical performance of the backlight module.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION OF PREFERRED EMBODIMENTS

Figure 1:
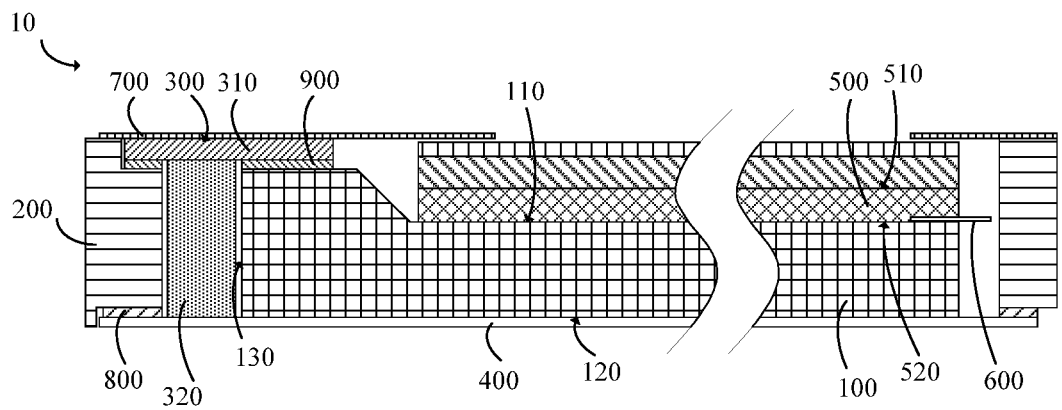
FIG. 1 is a schematic structural diagram of a backlight module according to an embodiment of the present disclosure.

The following description of the various embodiments is provided to illustrate the specific embodiments with reference to the accompanying drawings.

In order to make the above description of the present disclosure and other objects, features, and advantages of the present disclosure more comprehensible, preferred embodiments are described below, and are described in detail below with reference to the accompanying drawings. Furthermore, directional terms described by the present disclosure, such as up, down, top, bottom, front, back, left, right, inner, outer, side, surrounding, center, horizontal, vertical, longitudinal, axial, radial, uppermost or lowermost, etc., are only directions by referring to the accompanying drawings, and thus the used terms are used only for the purpose of describing embodiments of the present disclosure and are not intended to be limiting of the present disclosure.

In the drawings, units with similar structures are labeled with the same reference number.

Figure 2:
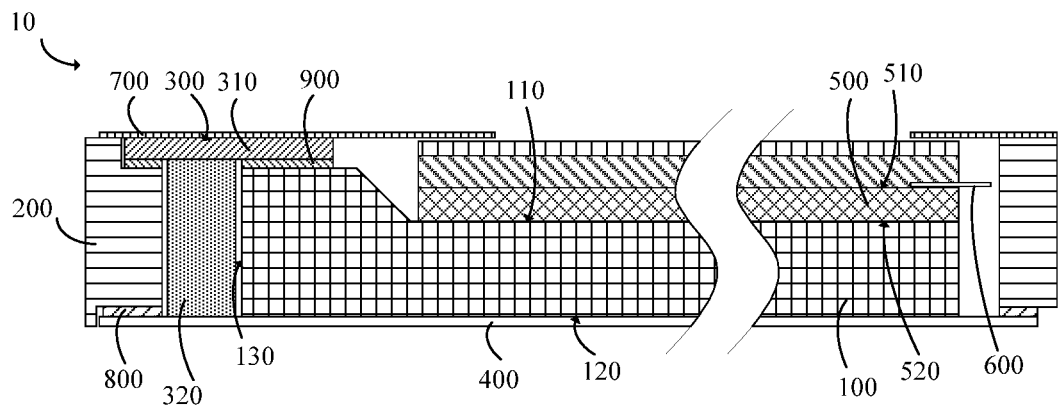
FIG. 2 is a schematic structural diagram of a backlight module according to another embodiment of the present disclosure.

Referring to FIGS. 1 and 2, the backlight module 10 of the embodiment of the present disclosure includes a light guide plate 100, a frame 200, a light source assembly 300, a reflective sheet 400, an optical film 500, and a light shielding sheet 600. The backlight module 10 is applied to, for example, a small-sized liquid crystal backlight module. The light guide plate 100 includes a top surface 110, a bottom surface 120, and a side surface 130 interconnecting the top surface 110 to the bottom surface 120. The frame 200 is disposed around the light guide plate 100. The light source assembly 300 is disposed on the side surface 130 of the light guide plate 100 and fixed on the light guide plate 100 and the frame 200. The reflective sheet 400 is disposed on the bottom surface 120 of the light guide plate 100. The optical film 500 is disposed on the top surface 110 of the light guide plate 100. The light shielding sheet 600 is disposed on a surface of the optical film 500 away from the light source assembly 300. The backlight module 10 of the embodiments of the present disclosure can improve light leakage of the backlight module 10 through the light shielding sheet 600 and improve an optical performance of the backlight module 10.

In details, referring to FIG. 1, the optical film 500 includes an upper surface 510 and a lower surface 520 opposite to the upper surface 510, the lower surface 520 of the optical film 500 is in contact with the top surface 110 of the light guide plate 100, and the light shielding sheet 600 is disposed on the lower surface 520 of the optical film 500, on the top surface 110 of the light guide plate 100, and between the optical film 500 and the light guide plate 100.

In details, referring to FIG. 1, the light shielding sheet 600 is disposed on the upper surface 510 of the optical film 500.

In details, referring to FIGS. 1 and 2, the present disclosure, the light shielding sheet 600 protrudes from an edge of the optical film 500 to achieve good light shielding performance to opposite sides of the light source assembly 300, that is, to achieve good light shielding performance to a position away from the light source assembly 300. The light shielding sheet 600 protrudes from an edge of the light guide plate 100 to achieve good light shielding performance to opposite sides of the light source assembly 300, that is, to achieve good light shielding performance to a position away from the light source assembly 300. A thickness of the light shielding sheet 600 is less than or equal to 0.01 mm. The light shielding sheet 600 is formed by a flexible member to prevent wrinkles of the optical film sheet 500 from being affected in an extreme environment.

In details, referring to FIGS. 1 and 2, the backlight module 100 further includes a light shielding adhesive 700 and an electrically conductive double-sided tape 800, the light shielding adhesive 700 is disposed on the optical film 500 and the frame 200, such that the optical film 500 is fixed on the frame 200 by the light shielding adhesive 700, and the electrically conductive double-sided tape 800 is disposed between the reflective sheet 400 and the frame 200, such that the reflective sheet 400 is fixed on the frame 200 by the electrically conductive double-sided tape 800. The light shielding adhesive 700 is used to position the optical film 500 and is used for shading.

In details, referring to FIGS. 1 and 2, the light source assembly 300 includes a light source flexible circuit board 310 and a light source 320 disposed on the light source flexible circuit board 310, and the backlight module 10 further includes a double-sided tape 900 disposed among the light source flexible circuit board 310, the frame 200, and the light guide plate 100, such that the light source flexible circuit board 310 is fixed on the frame 200 and the light guide plate 100 by the double-sided tape 900.

Figure 3:
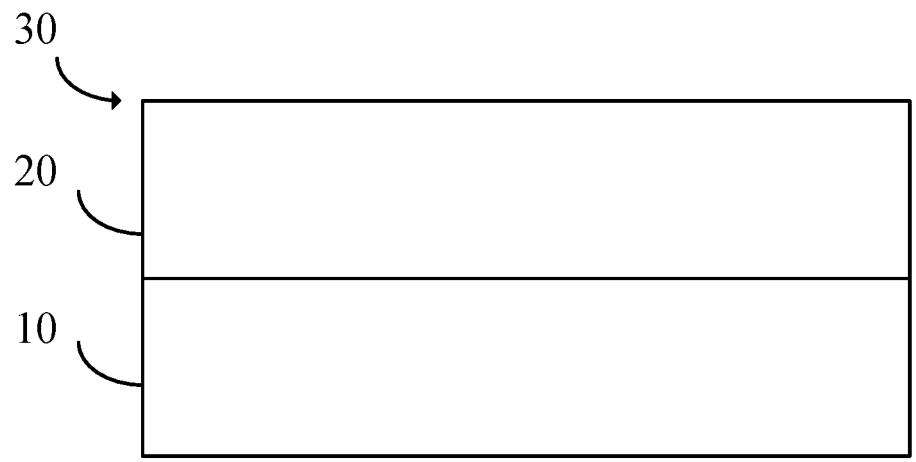
FIG. 3 is a schematic structural diagram of a display device according to another embodiment of the present disclosure.

Referring to FIG. 3, a display device 30 of the embodiment of the present disclosure includes a display panel 20 and the backlight module 10 described above. The backlight module 10 is disposed under the display panel 20.

In summary, in the embodiments of the present disclosure, the backlight module and the display device include a light shielding film disposed on the surface of the optical film away from the light source assembly, which can improve light leakage of the backlight module through the light shielding sheet and improve an optical performance of the backlight module.

Although the present disclosure is described via one or more embodiments, those of ordinary skill in the art can come up with equivalent variations and modifications based upon the understanding of the specification and the accompanying drawings. The present disclosure includes all such modifications and variations, and is only limited by the scope of the appended claims. In particular, as to the various functions performed by the components described above, the terms used to describe the components are intended to correspond to any component performing the specific functions (e.g., which are functionally equivalent) of the components (unless otherwise indicated), even those which are structurally different from the disclosed structure for performing the functions in the exemplary embodiments in the specification shown herein. In addition, although a particular feature in the specification is disclosed in only one of many embodiments, this feature may be combined with one or more features in other embodiments which are desirable and advantageous to a given or particular application. Moreover, the terms "include", "have", "consist of", or variations thereof used in the detailed description or the claims are intended to be used in a manner similar to the term "comprising".

In summary, although the preferable embodiments of the present disclosure have been disclosed above. It should be noted that those of ordinary skill in the art can make a variety of improvements and substitutions on the premise of not deviating from the technical principle of the present disclosure, and these improvements and substitutions should be encompassed within the protection scope of the present disclosure.

The invention claimed is:

1. A backlight module, comprising:
   a light guide plate comprising a top surface, a bottom surface, and a side surface interconnecting the top surface to the bottom surface;
   a frame disposed around the light guide plate;
   a light source assembly disposed on the side surface of the light guide plate and fixed on the light guide plate and the frame;
   a reflective sheet disposed on the bottom surface of the light guide plate;
   an optical film disposed on the top surface of the light guide plate; and
   a light shielding sheet disposed on a surface of the optical film away from the light source assembly.

2. The backlight module according to claim 1, wherein the optical film comprises an upper surface and a lower surface opposite to the upper surface, the lower surface of the optical film is in contact with the top surface of the light guide plate, and the light shielding sheet is disposed on the lower surface of the optical film, on the top surface of the light guide plate, and between the optical film and the light guide plate.

3. The backlight module according to claim 1, wherein the light shielding sheet is disposed on the upper surface of the optical film.

4. The backlight module according to claim 1, wherein the light shielding sheet protrudes from an edge of the optical film.

5. The backlight module according to claim 1, wherein the light shielding sheet protrudes from an edge of the light guide plate.

6. The backlight module according to claim 1, wherein a thickness of the light shielding sheet is less than or equal to 0.01 mm.

7. The backlight module according to claim 1, wherein the light shielding sheet is formed by a flexible member.

8. The backlight module according to claim 1, further comprising a light shielding adhesive and an electrically conductive double-sided tape, wherein the light shielding adhesive is disposed on the optical film and the frame, such that the optical film is fixed on the frame by the light shielding adhesive, and the electrically conductive double-sided tape is disposed between the reflective sheet and the frame, such that the reflective sheet is fixed on the frame by the electrically conductive double-sided tape.

9. The backlight module according to claim 1, wherein the light source assembly comprises a light source flexible circuit board and a light source disposed on the light source flexible circuit board, and the backlight module further comprises a double-sided tape disposed among the light source flexible circuit board, the frame, and the light guide plate, such that the light source flexible circuit board is fixed on the frame and the light guide plate by the double-sided tape.

10. A display device, comprising:
    a display panel; and
    a backlight module disposed under the display panel, and the backlight module comprising:
       a light guide plate comprising a top surface, a bottom surface, and a side surface interconnecting the top surface to the bottom surface;
       a frame disposed around the light guide plate;
       a light source assembly disposed on the side surface of the light guide plate and fixed on the light guide plate and the frame;
       a reflective sheet disposed on the bottom surface of the light guide plate;
       an optical film disposed on the top surface of the light guide plate; and
       a light shielding sheet disposed on a surface of the optical film away from the light source assembly.

11. The display device according to claim 10, wherein the optical film comprises an upper surface and a lower surface opposite to the upper surface, the lower surface of the optical film is in contact with the top surface of the light guide plate, and the light shielding sheet is disposed on the lower surface of the optical film, on the top surface of the light guide plate, and between the optical film and the light guide plate.

12. The display device according to claim 10, wherein the light shielding sheet is disposed on the upper surface of the optical film.

13. The display device according to claim 10, wherein the light shielding sheet protrudes from an edge of the optical film.

14. The display device according to claim 10, wherein the light shielding sheet protrudes from an edge of the light guide plate.

15. The display device according to claim 10, wherein a thickness of the light shielding sheet is less than or equal to 0.01 mm.

16. A backlight module, comprising:
    a light guide plate comprising a top surface, a bottom surface, and a side surface interconnecting the top surface to the bottom surface;
    a frame disposed around the light guide plate;
    a light source assembly disposed on the side surface of the light guide plate and fixed on the light guide plate and the frame;
    a reflective sheet disposed on the bottom surface of the light guide plate;
    an optical film disposed on the top surface of the light guide plate; and
    a light shielding sheet disposed on a surface of the optical film away from the light source assembly;
    wherein the light shielding sheet protrudes from an edge of the optical film;
    wherein the light shielding sheet protrudes from an edge of the light guide plate;
    wherein a thickness of the light shielding sheet is less than or equal to 0.01 mm; and
    wherein the light shielding sheet is formed by a flexible member.

17. The backlight module according to claim 16, wherein the optical film comprises an upper surface and a lower surface opposite to the upper surface, the lower surface of the optical film is in contact with the top surface of the light guide plate, and the light shielding sheet is disposed on the lower surface of the optical film, on the top surface of the light guide plate, and between the optical film and the light guide plate.

18. The backlight module according to claim 16, wherein the light shielding sheet is disposed on the upper surface of the optical film.

19. The backlight module according to claim 16, further comprising a light shielding adhesive and an electrically conductive double-sided tape, wherein the light shielding adhesive is disposed on the optical film and the frame, such that the optical film is fixed on the frame by the light shielding adhesive, and the electrically conductive double-sided tape is disposed between the reflective sheet and the frame, such that the reflective sheet is fixed on the frame by the electrically conductive double-sided tape.

20. The backlight module according to claim 16, wherein the light source assembly comprises a light source flexible circuit board and a light source disposed on the light source flexible circuit board, and the backlight module further comprises a double-sided tape disposed among the light source flexible circuit board, the frame, and the light guide plate, such that the light source flexible circuit board is fixed on the frame and the light guide plate by the double-sided tape.

* * * * *